United States Patent [19]

Kleinman et al.

[11] Patent Number: 5,724,503
[45] Date of Patent: Mar. 3, 1998

[54] METHOD AND APPARATUS FOR INTERPRETING EXCEPTIONS IN A DISTRIBUTED OBJECT SYSTEM

[75] Inventors: Ron Kleinman, Santa Clara; Ken M. Cavanaugh, III, Montara; Mark W. Hapner, San Jose, all of Calif.

[73] Assignee: Sun Microsystems, Inc., Palo Alto, Calif.

[21] Appl. No.: 414,775

[22] Filed: Mar. 31, 1995

[51] Int. Cl.$^6$ .................................................. G06F 11/30
[52] U.S. Cl. .......................... 395/185.1; 395/683
[58] Field of Search ........................ 395/754, 757, 395/758, 680, 683, 684, 183.01, 183.03, 183.15, 185.01, 185.02, 185.04, 185.07, 185.1

[56] References Cited

U.S. PATENT DOCUMENTS

| | | | |
|---|---|---|---|
| 4,365,315 | 12/1982 | Jamnik | 395/758 |
| 4,965,772 | 10/1990 | Daniel et al. | 395/754 |
| 5,175,684 | 12/1992 | Chong | 395/754 |
| 5,307,265 | 4/1994 | Winans | 395/758 |
| 5,367,681 | 11/1994 | Foss et al. | 395/683 |
| 5,428,619 | 6/1995 | Schwartz et al. | 371/20.1 |
| 5,434,776 | 7/1995 | Jain | 395/758 |

*Primary Examiner*—Kevin A. Kriess
*Attorney, Agent, or Firm*—Hickman Beyer & Weaver

[57] ABSTRACT

A computer system and a computer-implemented method are described which may be used in a distributed client/server computing environment to convert an exception identifier received by a host computing system from a remote device to a more readable message string that corresponds to the exception identifier. The exception identifier is arranged to uniquely identify the exception. Initially, the exception identifier is used to help identify an exception tag that includes a domain name and a message identifier. The message string that corresponds to the exception identifier is then found based at least in part upon the domain name and the message identifier. More specifically, the domain name is used to identify an exception message file that corresponds to the remotely located device. The message identifier is then used to locate a message string within the exception message file that corresponds to the exception indicated by the exception identifier. The message string typically provides a textual explanation of the exception written in a base language.

24 Claims, 7 Drawing Sheets

| SITE PREFIX | MODULE(S) | INTERFACE | EXCEPTION NAME |
|---|---|---|---|
| 321 | 323 | 325 | 327 |

METHOD AND APPARATUS FOR INTERPRETING EXCEPTIONS IN A DISTRIBUTED OBJECT SYSTEM

BACKGROUND OF THE INVENTION

The present invention relates generally to the fields of distributed computing systems, client-server computing and object-oriented programming. More specifically, the present invention relates to methods and apparatus for interpreting exceptions in a distributed object system.

Object-oriented programming methodologies have received increasing attention over the past several years in response to the increasing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program. Also, the ability to handle data is breaking down because the volume of information is growing at a faster rate than our ability to process it. Computer hardware performance has increased dramatically over the past decade, yet software performance has not. Traditional software approaches to designing, developing and maintaining information processing systems continue to limit our ability to manage data.

Object-oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects to be reused in different programs. Thus, programmers can develop libraries of "tried and true" objects that can be used over and over again in different applications. This modularity increases software reliability while decreasing development time, as reliable programming code may be used repeatedly. For further description of object-oriented design and programming techniques see *Object-Oriented Technology* by David A. Taylor, Addison-Wesley 1990, *Object-Oriented Modeling and Design* from General Electric Research and Development Center, Prentice-Hall 1991, and *Object-oriented Software Construction* by Bertrand Meyer, Prentice-Hall 1988, for example. These three books are incorporated herein by reference.

However, the full promise of object-oriented methodologies, especially the advantages afforded by their modularity, has yet to be achieved. In particular, it would be highly desirable to allow programmers and other users access to objects in a transparent fashion so that objects created in different programming languages and objects residing on different computing platforms that are networked together are accessible to the user without extensive modification of the user's programming code.

In client-server computing, there are typically a number of computers that are arranged to communicate with one another through a network connecting the computers. Some of these computers act as providers of services or functionality to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

Attempts to provide such a distributed system have been made using object-oriented methodologies that are based upon a client-server model, in which server objects provide interfaces to client objects that make requests of the server objects. In such a distributed system, these servers are objects consisting of data and associated methods. The client objects obtain access to the functionalities of the server objects by executing calls on them, which calls are mediated by the distributed system. When the server object receives the call it executes the appropriate method and transmits the result back to the client object. One way in which the client and server can communicate is through an Object Request Broker (ORB) which is used to locate the various distributed objects and to establish communications between objects.

The object metaphor in distributed systems is a useful technique as it separates the object's interface from its implementation; thus allowing software designers to take advantage of the functionalities of various objects available to them without having to worry about the details of the object's implementation. The programmer need only be aware of the object's interface. In addition, object oriented distributed systems allow for multiple implementations of a single interface which may reside on different computing platforms that have been connected through a network. Thus, a programmer working on one machine of a network may make a call to an object about which the programmer has no detailed knowledge, with the confidence that the remote object will be called, a method will execute, and data output will be returned properly or, in the case of an error, an exception will be raised. Such a system maximizes the inherent advantages of object-oriented methodologies by taking full advantage of their modularity and encapsulation.

Another advantage of a distributed object system is that distributed objects are location-independent. That is, distributed objects may exist anywhere in a network: in the client's address space; in multiple address spaces on the client's machine; and in multiple machines across the network. All objects are treated uniformly by clients, no matter where their location. Further, distributed object systems provide greater functionality than conventional systems since application developers can rely on existing inventories of objects to provide base level functionality. They also include improved portability since applications can cooperate through user-defined platform-independent interfaces and also facilitate reduced development cost. Many other benefits can be realized with a distributed object system as well.

The software industry has responded to this need for a distributed object technology by forming the Object Management Group (OMG). The goal of the OMG is the definition of the Object Management Architecture (OMA), which has four major components: the Object Request Broker (ORB), Object Services, Common Facilities, and Application Objects. The Object Request Broker provides basic location transparent object communications and management services, thus forming the basis of a distributed object system. A standard for an Object Request Broker is contained in the Common Object Request Broker Architecture (CORBA) specification.

A challenge in developing such a distributed object system is to provide to the client process a text string in English or another language that describes the error that has occurred when an exception is raised in response to a request for the services of an object. There are two basic types of exceptions: system exceptions and user exceptions. System exceptions are raised when errors are detected in the infrastructure of the object management facility which are not directly related to the client's request. By way of example, such an exception might indicate that there is insufficient memory to service the client's request, that there has been a communication failure in the network, or that the server process which contains the implementation for the object is unavailable.

User exceptions are defined as a part of the interface to an object, and are used to report errors that might be expected to occur during the servicing of specific requests to that object. Such an exception might indicate that an invalid parameter was passed to the server process, or that a requested resource is unavailable. For example, if a client process makes a request of an object to "Connect to Modem", the client process assumes that a modem exists and is expecting that a connection will be made and an acknowledgment returned. However, if for some reason the modem is not available to the server, an error has occurred. The server process would then raise an exception and send a unique exception identifier back to the client process. The exception identifier must be a unique "tag" produced by the system that can be used to identify the cause of the exception. This exception identifier may be a string, number, code or any other symbolic information that can uniquely identify the cause of the exception to the client. The object implementer may have specified an English language string that describes the exception identifier, such as "Connection to Modem Failed—No Modem Found On System", but this string is not guaranteed to be unique, or it may be in the wrong language for the client and is therefore not sent back to the client process.

That is, in such a distributed object system only the unique exception identifier is sent back across the network to the client process. Thus, the client process does not receive an English language string that explains the exception. This is a disadvantage in that the client process is not able to log or to display to a user the reason why the request has failed. The problem is compounded in a distributed system present in different countries where users of the system may speak a variety of foreign languages and are not able to receive explanations in their own native tongue.

In a non-distributed (i.e. local) system, all users may be assumed to speak the same language, the exception identifier only needs to be unique to the local system, and a client process can expand exception identifiers via a simple text file shared with the local object server process. One example of this approach is the "perror" system routine supported by many Unix systems.

Where the client and server are distributed, the server could attempt to provide exception text for all languages spoken by any potential user. However, since the server is otherwise independent of the location and number of accessing clients, this has proved to be impractical. Therefore, the actual exception text, in the language of the client, must reside on the client machine. This requires the server to send a unique exception identifier that is unique across all possible applications running on any node supported by the object request broker. Such an identifier cannot simply be a text string in an agreed upon language (for example English) as there is no guarantee that such a string could remain unique given the fact that a client could receive exceptions from a variety of independently developed object servers. The invention described herein solves these difficulties by implementing a dual level mapping approach at the client node. At the first level, the unique exception identifier is translated to a textual explanation in a host language (e.g. English). At the second level, the host language explanation is translated from the host language to an end user specified language.

SUMMARY OF THE INVENTION

To achieve the foregoing a computer system and a computer-implemented method are described which may be used in a distributed client/server computing environment to convert an exception identifier received by a host computing system from a remote device to a more readable message string that corresponds to the exception identifier. The exception identifier is arranged to uniquely identify the exception. Initially, the exception identifier is used to help identify an exception tag that includes a domain name and a message identifier. The message string that corresponds to the exception identifier is then found based at least in part upon the domain name and the message identifier. More specifically, the domain name is used to identify an exception message file that corresponds to the remotely located device. The message identifier is then used to locate a message string within the exception message file that corresponds to the exception indicated by the exception identifier. The message string typically provides a textual explanation of the exception written in a base language.

The described method may be used to handle both server (user) generated exceptions and system generated exceptions. In one embodiment, when the exception identifier represents a user exception, an interface repository mechanism is accessed using the exception identifier to obtain a first portion of the exception tag and repeated calls are made to the interface repository mechanism to obtain additional portions of the exception tag until all portions of the exception tag have been determined.

In another embodiment, when it is desirable to provide the textual explanation in a language other than the base language, an international service function may be accessed which looks up and returns a translated string that provides the message of the message string in a second language. The translated strings may reside in a exception translation file that corresponds to the exception message file.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

In the following description, for purposes of explanation, specific data and configurations are set forth in order to provide a thorough understanding of the present invention. The preferred embodiment described herein is implemented as a portion of the Distributed Objects Environment (DOE) system created by SunSoft, a business unit of Sun Microsystems, Inc. However, it will be apparent to one skilled in the art that the present invention may be practiced without the specific details and may be implemented in various distributed computer systems.

I. DEFINITION OF TERMS

A distributed object system is in general an implementation of distributed object technology and refers to a computer system having distributed objects that communicate through an Object Request Broker (ORB).

The Object Request Broker (ORB) provides basic object communications and management services, thus forming the basis of a distributed object system.

A client process is a software process that issues a request for service to one or more server processes. It is conceivable that the client process and the server process would be present on the same machine, and at times, may even be the same process, although neither would be a required limitation.

An interface definition language (IDL) is a language that is used to define the interfaces of objects. A server implements these interfaces; a client accesses these implementations through their interfaces.

The term object or distributed object refers to an encapsulated package of code and data that can be manipulated by operations through the interface of the object. Thus, those of skill in the art will note that distributed objects include the basic properties that define traditional programming objects. However, distributed objects differ from traditional programming objects by the inclusion of two important features. First, distributed objects are language independent. The interfaces of distributed objects are defined using an interface definition language that can be mapped to a variety of different programming languages. One such interface definition language is IDL. Second, distributed objects are location-independent, i.e., distributed objects can be located anywhere in a network. This contrasts sharply with traditional programming objects which typically exist in a single address space: the address space of the client process. Distributed objects can be client objects or server objects, depending upon whether they are sending requests to other objects or replying to requests from other objects. Client objects and server objects in distributed object systems communicate in terms of their interfaces defined in the interface definition language. Requests and replies are made through an Object Request Broker (ORB) that is aware of the locations and status of the objects. Client objects and server objects can exist within the same process, or in different processes on the same host computer, or in processes residing on two different host computers.

The Object Development Framework (ODF) is the programming model for developing CORBA compliant distributed objects in C++. ODF provides simple mechanisms that allow the developer to specify how an object is to be created, where it is to be installed, and to customize its activation and deactivation parameters. ODF also provides functionality for implementing multi-threaded objects and managing object persistent data.

An object reference is used by clients to access a remote object. Generally, object references exist only within a client process. They can be imported and exported as a string. Each object reference can refer to only one object; however, several object references may refer to the same object.

An object interface is a specification of the operations, attributes, and exceptions that an object provides. In one embodiment, object interfaces for distributed objects may be written using the OMG interface definition language (IDL). As noted above, objects service client requests through their interfaces. The use of interfaces therefore relieves an object from having to know other programming languages used to access its methods and data via the object reference in the client.

The interface repository (IFR) keeps track of all interfaces that are used in the system. The IFR is described in the Interface Repository Chapter of the CORBA specification, "The Common Object Request Broker: Architecture and Specification", Revision 1.2, Draft 29 December 1993, and is incorporated herein by reference.

II. SPECIFIC EMBODIMENTS

The invention described herein provides a mechanism for interpreting exceptions raised in a distributed client/server computing systems. The embodiment described was developed to operate in conformance with the OMG's CORBA specifications and has been optimized to utilize some of the components mandated by the CORBA specification, such as the interface repository. However, it should be appreciated that the invention may readily be adapted for use in other distributed computing systems as well.

As pointed out above, a challenge in the development of a distributed object system is determining how to report exceptions to a client that are raised by a remote server object in response to a request for the services from the remote server object. In CORBA systems, a standardized exception format is required that does not permit extended text string explanation and is independent of the native language in either the client or the server. Therefore, in order to permit developers to provide customers with meaningful explanations, the present invention contemplates storing the actual exception text, in the language of the client, on the client machine. This requires the server to send a unique exception identifier (unique across all possible applications running on any node supported by the object request broker). When a server returns an exception identifier, the client first uses the exception identifier to derive an exception tag. The exception tag can then be used to locate the host exception file on the client computer that provides a base language (e.g. English) explanation. When necessary, the base language explanation can be used to locate the foreign file to produce the foreign language translation of the explanation. The appropriate explanation can then be displayed to the user or logged for later analysis.

To support this type of system, a developer of a server identifies and defines exceptions within the interface of an object. This interface is compiled into a message file, and the message file is edited to add base language textual explanations which may be in any appropriate language. In the examples herein, the base textual explanations are in English, however, it should be appreciated that they may be in any suitable language. The message file is then used to generate a host (base) exception message file and a foreign exception message file. The host file contains the base language (English) explanations, and the foreign file containing explanations in other languages. When a "client" object that will make use of the server is installed on a new machine, the host files are installed on the new machine together with the "client" object.

Figure 1:
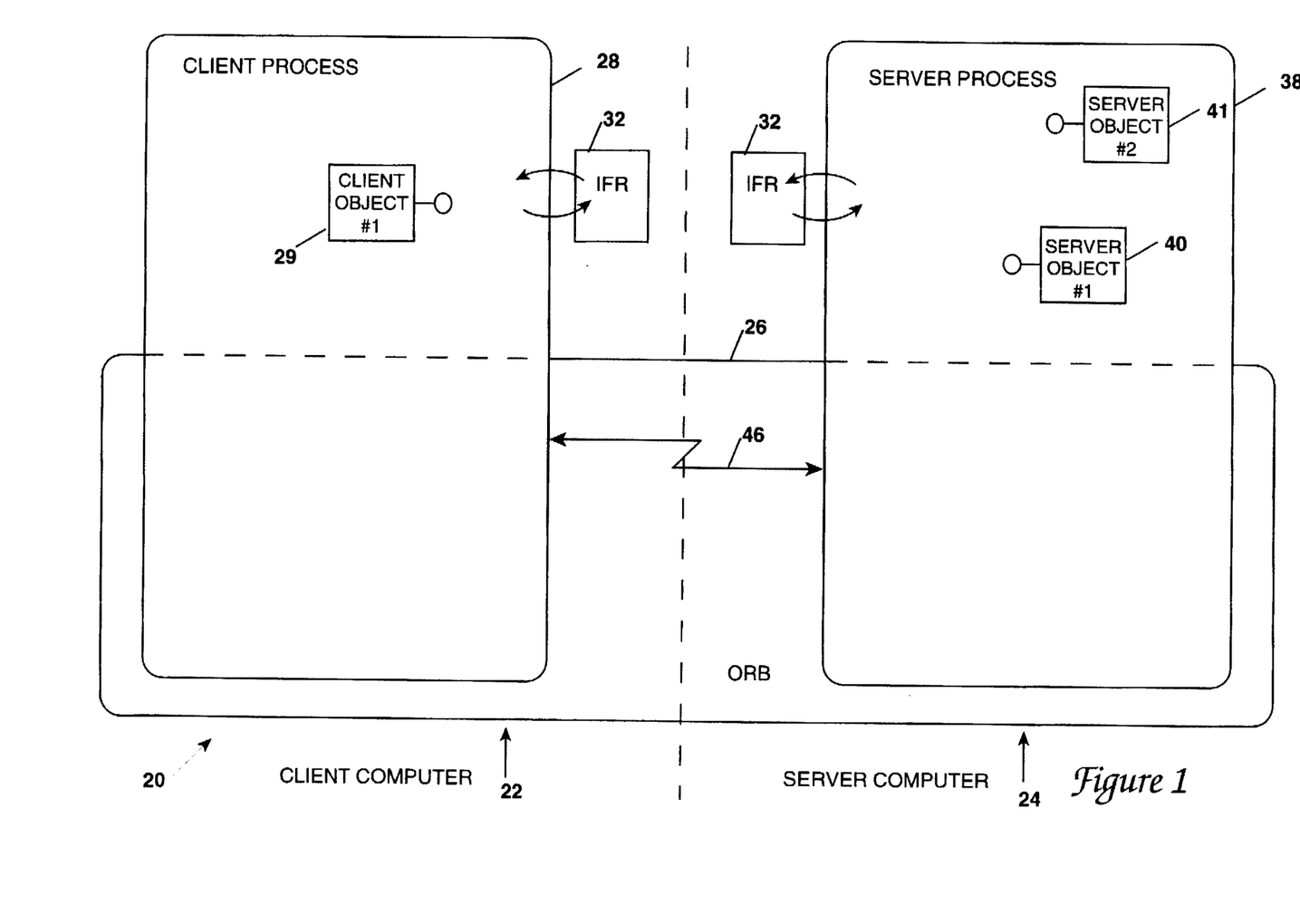
FIG. 1 is a symbolic representation of a distributed object system.

Referring initially to FIG. 1, an example of a client server relationship in a distributed object system 20 is symbolically illustrated. The distributed object system includes a client computer 22, a server computer 24, and an Object Request Broker (ORB) 26 which is present on each computer and throughout the distributed object system 20. Also shown is a client process 28 which contains a client object 29 and an interface repository (IFR) 32. A server process 38 contains objects 40 and 41. A network communication device 46 provides communication between the client computer 22 and the server computer 24. The interface repository (IFR) 32 may be present on each node within the distributed object system, that is, present in the memory of each computer on the system. In alternative embodiments, the IFR may be centralized to one location in the network. In the interest of clarity, the structure of the IFR will not be described herein. However, as will be appreciated by those skilled in the art, its structure is described in the CORBA specifications.

The distributed object system 20 shows only one client computer 22 with a client process 28, and only one server computer 24 with a server process 38. However it should be appreciated that there could be any number of computers and processes in a distributed object system, and there may be many processes on a given computer. Also, a given process could be considered both a client or a server, depending upon whether the process is making a request from an object or receiving such a request. If a process is making a request about a target object, it is termed the client process, and if a process implements the target object, it is termed the server process. Also it is conceivable that both the client process 28 and the server process 38 could be running on the same host computer. Although the methods describe herein may be used to handle same host inquiries, in most cases, more efficient procedures would be used to handle same host inquiries. The client computer 22 and the server computer 24 may be any type of computing device capable of supporting objects, including super-computers, minicomputers, workstations, personal computers, personal digital assistants and other electronic computing devices. In general, the client process 28 and the server process 38 are software processes running on a computer in a defined memory space. These processes may be written in different programming languages. A process could be an application program, a database, network communication software or any of a variety of other software based programs.

A client is such a process that invokes a method on a distributed object. A client might itself be a distributed object, or it might be a non-object oriented program (or process), but while invoking a method on a distributed object, it is said to be acting as client. Also, the system software itself may act as a client.

As shown in FIG. 1, the ORB 26 is present on each computing device (in this case the client computer 22 and the server computer 24) and also across the network 46. The ORB provides basic object communication and management services. Within this distributed object system 20, a client may make a request of a server. If the server raises an exception, and returns an exception identifier to the client, it would be desirable for the client to be able to access an explanation text string. This explanation text string would explain the exception, and could then be displayed to the user or logged. One embodiment of the present invention which addresses this need is described below.

As previously discussed, the described embodiment includes two phases. In a first phase, the explanation message strings that describe particular exceptions are added to a file along with corresponding message identifiers unique within that file. Also, the foreign translations of these explanation message strings may optionally be created and added to a file. These files are then compiled and transferred to the client machine for later access by the client. In a second phase of the invention, when the client makes a request of the server process and receives an exception identifier, the client is able to convert this exception identifier into an explanation message string by accessing these uniquely named files previously installed on the client machine. The first phase of the present invention will now be described with reference to the flow chart of FIG. 2.

Figure 2:
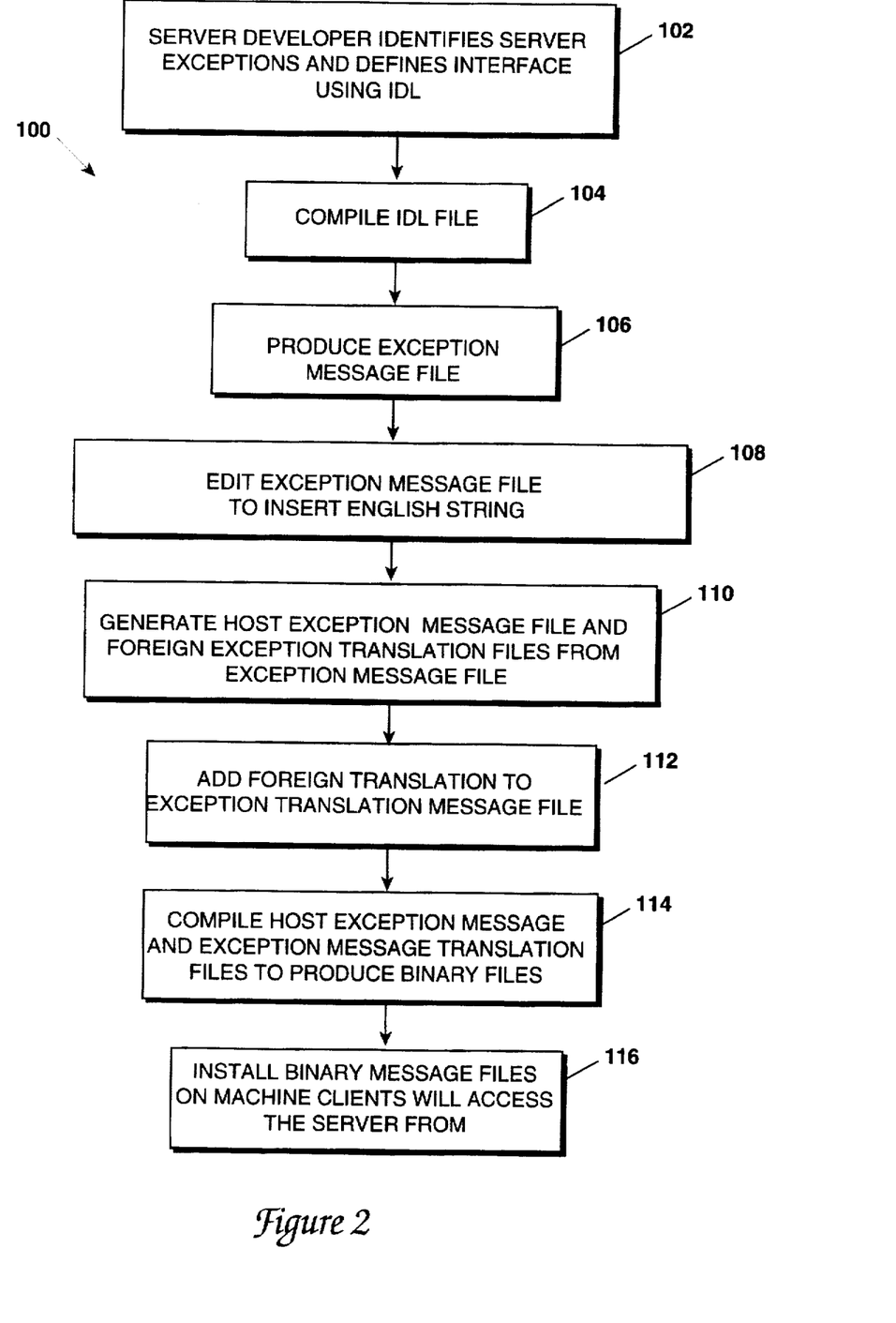
FIG. 2.is a flow chart showing the steps used to produce the host and foreign exception message files in accordance with one embodiment of the present invention.

Initially, in step 102 a developer of a server process and/or a developer of objects within that server will identify which exceptions are applicable. The exceptions are then defined in the interface of the object. These interfaces and exceptions are defined using the interface definition language (IDL). In other words, the IDL defines what exceptions an object can throw. These exceptions are referred to as "user exceptions". For example, if a developer is defining an interface to an object "Modem", and wishes to provide an exception for the situation in which a client is trying to access a modem, yet there is no modem available to the server, the developer may use IDL to define the following interface, which allows the server to return the exception "no_modem":

module Peripherals {
 Interface Modem {
 exception no_modem { };
};
};

In the following example, an interface "Stack" is defined which declares two exceptions, "underflow and overflow":

interface Stack
{
exception underflow { };
exception overflow{
 long size_limit;
};
readonly attribute long size;
long pop( )
 raises (underflow);
void push (in long n)
 raises (overflow);
boolean isEmpty ( );
};

Once the exceptions are defined in IDL, the IDL file is compiled, as shown in step 104. By way of example, the IDL file may be compiled into C or C++ code. The IDL compiler will also populate the local interface repository, with information on objects and their interfaces. The compiler will also produce the exception message text file, as shown in step 106. This file is a template that contains message identifier—message string pairs. The message identifier will identify the name of the exception, and the message string will be left blank for the developer to later fill in with an explanation. For example, using the above modem example, the compiler would produce a portion of the exception message file that would appear as follows:

```

msgid "Modem_no_modem"
msgstr " "
```

Note in this example that "msgid" represents the message identifier and is a concatenation of the interface name and the name of the exception. Other variations of the message identifier are possible. For example, the message identifier may be just the name of the exception. The important point is that the combination of file name and message ID be unique for all possible exceptions of all possible interfaces anywhere in the ORB. Here, "msgstr" represents the message string, and has been left blank. If the developer had defined more exceptions in IDL, there would be more message identifier—message string pairs. For every exception defined in IDL, there will be one of these pairs in the exception message file.

In step 108, the developer edits the exception message file in order to insert the English language strings that explain the exception. In other words, the message string will explain the exception that is named as the message identifier. For example, after a developer had edited the above example, the exception message file would look as follows:

```

msgid "Modem_no_modem"
msgstr "Connection to Modem Failed—No Modem Found On System"

```

Having a message string as above is advantageous as one can see that the full text explanation can be much more useful to a user than simply the name of the exception. It should be appreciated that the message string need not be limited to a text string. The message string may be a string of numbers, symbols or other characters—anything that might be useful to an end user.

It is also possible for exceptions to occur as a result of failures in the system infrastructure, or in situations that have little to do with the method that caused the failure. These exceptions are referred to as "system exceptions". A system exception might occur if the server goes down or if there is a communications failure or if the server runs out of memory. System exceptions are defined in the system source code by the system developer. Users (or developers of servers or objects) cannot define system exceptions. System exceptions have a slightly different format than user exceptions, as defined below.

In the case of system exceptions, step 108 would be performed by a system developer, who would directly create this exception message file. For example, if a system developer has defined an exception "NO_MEMORY", he may specify the equivalent "msgstr" in the exception message file that would appear as follows:

```

msgid NO_MEMORY/ANY/1 Bad_Any
msgstr "dynamic memory allocation failure"

```

In this example, "NO_MEMORY" is the name of a CORBA system exception class. "Any" is an internal subsystem name, and "1" is a minor code for this exception. "Bad_Any" is an internal identifier in the source code. In the described embodiment, all system exceptions will have minor codes. A minor code is a number that allows a system developer to define with finer granularity the exceptions that may occur. For a system exception, the explanation message string of the exception message file will explain the system exception and the minor code. User exceptions do not contain minor codes. Thus, the exception message file may be filled in by a server developer, or by a system developer. It is also contemplated that this file may be created by other individuals, or may even be created automatically by a software program.

In an alternative embodiment of the invention, the message string is placed directly in the IDL definition of the interface rather than being placed in a separate message text file. That is, when the server developer or system developer is defining the exception in the IDL, the corresponding explanation message string would be placed directly into the interface definition as well. This step would obviate the need for separate exception message files. In addition, when an exception is raised, the message string could be passed directly back to the client along with the exception identifier.

After the message strings have been added to the exception message file in step 108, the host exception message file and the exception translation file are created from the exception message file in step 110. The host exception file will be used to produce the host language (e.g. English) explanation string, and the translation file is used to hold the foreign language translation of this English string. There will be one host exception message file for each exception message file, but there could be many exception translation files for each exception message file, depending upon the number of foreign translations that are desired. These files are human-readable files. By way of example, the host exception message file and the exception translation files may be differentiated utilizing different extensions. For example, the host exception message file may use the extension ".pox" and the foreign exception message file uses the extension ".po". These files may be created by using a "make file script", although it is contemplated that other methods may be used as well. In the described embodiment, the specific software utilities that are used are termed "awk" and "nawk", although any utility capable of scanning files, recognizing patterns and producing new files may be used. The use of these utilities will be familiar to those of skill in the art. For user exceptions, the host exception message file has the same message identifier—message string pairs as the exception message file. For system exceptions, the host exception message file is slightly different from the exception message file, in that the internal system name is left off. In either case, the combination of file name and message ID is unique for all possible exceptions of all possible interfaces anywhere in the ORB. Using the system exception example above, a portion of the host exception message file would look as follows:

```

msgid NO_MEMORY/ANY/1
msgstr "dynamic memory allocation failure"

```

The foreign exception message file will appear the same as for user exceptions and as for system exceptions. This file will contain the message string of the exception message file for both the message identifier and the message string. For example, using the exception message file for the modem example above, the foreign exception message file would look as follows:

```

msgid "Connection to Modem Failed—No Modem Found On System"
msgstr "Connection to Modem Failed—No Modem Found On System"
```

Next in step 112 the foreign exception message file is edited to insert the foreign translation of the message string. This foreign language string will be accessed by clients in foreign locations who have a need for an explanation that is in a language other than English. The message identifier field is left as is, but the message string field is replaced with the foreign translation. For example, if the above foreign exception message file were to be used on a client machine in a Spanish-speaking locale, the file would be edited to allow for a Spanish translation, and a portion of the file would appear as follows:

msgid "Connection to Modem Failed—No Modem Found On System"
msgstr "Comunicacion con Modem no Sirvio. No se encuentra Modem en la sistema"

This editing is preferably performed by a person, but it is contemplated that computer software could also be used to automatically translate the message string in a host language (English, for example) to a foreign language. Also, as noted above, many foreign exception message files may be created, each file dedicated to a particular language. For a particular locale, the user of the system can indicate which foreign language is preferred by setting an environment variable. And it should be appreciated that each file may contain many message identifier—message string pairs, each pair representing an exception. As the client machines and clients may be present in many different locales in a distributed object system, it is advantageous to have the capability to provide translations into different languages.

In step 114, the host exception message file and any number of foreign exception message files are compiled into binary, computer readable form. The compiler will represent these files as lookup tables, implemented as a binary tree alphabetical lookup. A binary tree lookup will be familiar to those of skill in the art. There will be a different binary file for each of the host and foreign files that are compiled.

In step 116, these compiled, binary files representing the host exception message file and any number of foreign exception message files are transferred to the client machine and installed in directories in the client machine. These files are not arbitrarily named, but use a standard naming convention in order to facilitate retrieval of the message string during run time. For example, in one embodiment, the name of the binary host exception message file is the domain name plus the extension ".mox", and the name of the foreign exception message file is the domain name plus the extension ".mo". The significance and structure of the domain name will be described below in reference to FIG. 3. The exception handling routines can then map these binary files into memory for quick access at run time using the UNIX "mmap" facility, for example. In this fashion, the client process is set up to access the explanation message string when an exception is received from the server process or the system software. The client will be able to access an English string, or a foreign language string. The way in which the client process can access this string will now be described as the second phase of the present invention.

Figure 5:
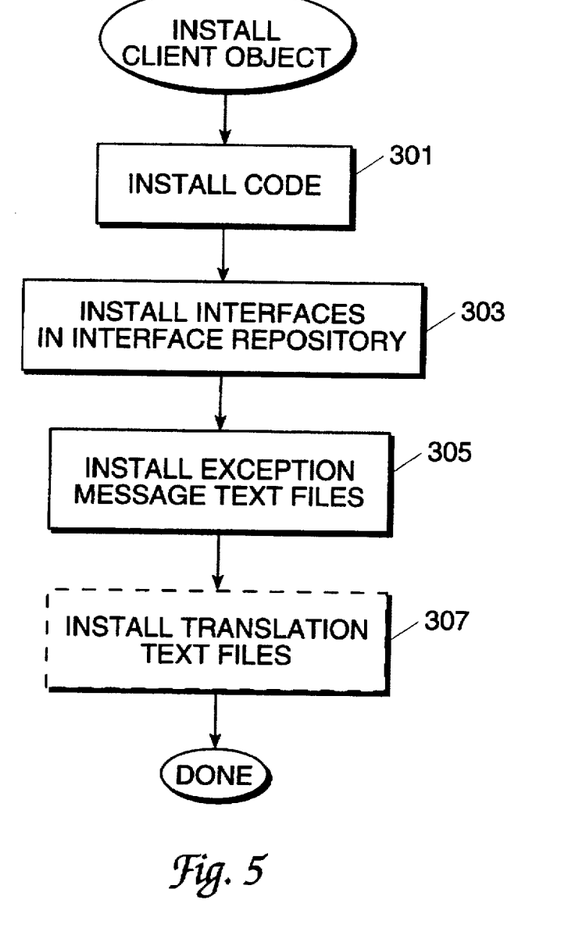
FIG. 5 is a flow chart illustrating the steps that occur during installation of an object onto a distributed system that are relevant to exception handling.

Once the binary files have been generated, they may be packaged with objects that will have a reason to call the associated server. Such packaging can be accomplished as part of a distributed object development function described in co-pending application Ser. No. 08/414,240 which is incorporated herein by reference in its entirety. That is, they are packaged with potential client objects. Referring next to FIG. 5 the relevant steps of a method for installing a object on a host computer system will be described. Initial, in a step 301, the code and/or any persistent data associated with the client object will be installed on the host computer system. Then, in step 303 all of the interfaces that are supported by the object are installed in the interface repository 32 of the host machine. Thereafter, in step 305, the exception message text files that are associated with the installed interfaces are installed onto the host machine. When the native language of the host machine's user(s) is not the base language of the exception file, the install operation may also optionally install the appropriate exception translation files in a step 307. Of course, it should be appreciated that in a distributed computing system, the install operation will typically have several other steps, such as registering the object with an object request broker (ORB), however, since those steps are not particularly relevant to the present invention, they are not described herein. Further, it should be appreciated that the install operation has been described in a particular order, the order by which the various files are installed may be varied in any appropriate manner.

Figure 3:
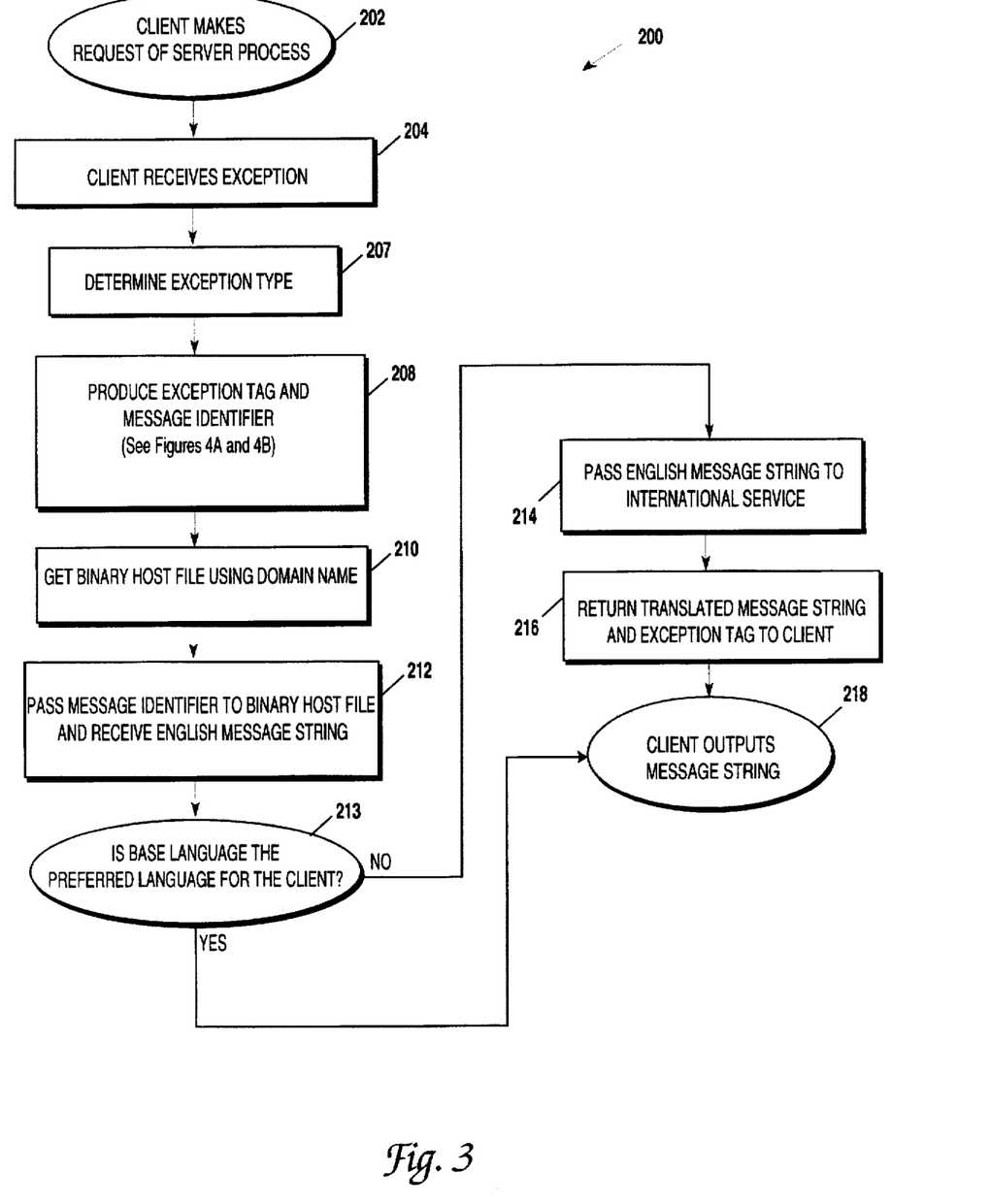
FIG. 3 is a flow chart showing a method for converting an exception identifier into an explanation message string.

Referring now to FIG. 3, a method by which a client can access the explanation message string upon receiving an exception from a server process will be described. In order to describe this process, it will be instructive to define the terms exception, exception name, exception tag and exception identifier. In general, an exception arises when an error occurs in a server process or in the system software. The use of "exception" in this sense then, refers to this situation. The name of the exception or "exception name" is the name that is given to the exception by the server developer or system developer when the exception is defined in the IDL, as in FIG. 2, step 102. In the modem example, the exception name is "no_modem".

Figure 6:
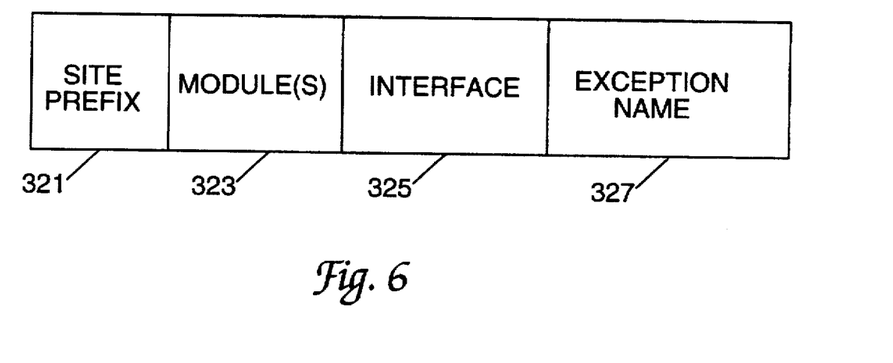
FIG. 6 is a diagram illustrating potential contents of a user exception tag.

The fully-scoped exception name represents a unique identifier for the exception throughout the distributed object system. The fully-scoped exception name uniquely qualifies the exception name and prevents one name from referring to more than one exception. It should be appreciated that the structure of the exception name may be widely varied and the entities that define a particular interface will have broad latitude in defining the structure of their identifiers. However, for illustrative purposes a representative exception ID structure is illustrated in FIG. 6. The fully scoped exception name may include various components, including the following. A first component may be a site prefix 321, which identifies the entity which defined the object interface. By way of example, the site prefix may be the Domain Name Service (DNS) code for an entity. For example, for a Sun Microsystems interface, the site prefix (domain name) may be "eng.sun.com". A second component may be the module name 323. A module is a group of interfaces and/or modules, exceptions, etc. Using the modem example, the module name would be "Peripherals". It should be appreciated that the module names may be nested. That is, more than one level of module names may be used. For example, using the modem example, the first module name may be "Peripherals" and a second level module name may be "Communications". A third component may be the name of the interface. Using the modem example, the interface name would be "modem". A fourth component may be the exception name itself. Using the modem example, the name would be "no_modem". Of course, other layers of naming components could be used as well. The OMG CORBA specification defines a standard for the fully-scoped exception name. Thus, a fully-scoped exception name could include the following components:

site prefix, module(s), interface, exception name

It should be appreciated that for a given implementation of a distributed object system, the fully-scoped exception name could be a subset of possible components, the above example illustrating some possibilities for components. The exception tag includes the components of the fully-scoped exception name in modified form. By way of example, the exception tag can be the fully-scoped exception name concatenated together with a double colon in between components. Other separators between components are possible. For a user exception, the fully-scoped exception name and the exception will have the same components. For a system exception, the exception tag may include the minor code and other information as well. By way of example, for a user exception, the exception tag could have the following format:

site prefix::module::interface::exception name

In an implementation of a distributed object system, a developer may be urged to use particular designated formats for the fully-scoped exception name. The designated formats may include all possible components, or a subset of the components. For example, in one embodiment, the fully-scoped exception name may use any one of four designated formats. Using the exception tag as an example, these four formats could appear as:

site prefix::exception name site prefix::module::exception name site prefix::module::interface::exception name site prefix::interface::exception name Of course, other permutations may be provided as designated formats as well. The following example uses the modem example to illustrate how the exception tag would appear in these four formats:

sun.eng.com::no_modem sun.eng.com::Peripherals::no_modem sun.eng.com::Peripherals::modem::no_modem sun.eng.com::modem::no_modem It should be appreciated that the fully-scoped exception name (and hence the exception tag) may take the form of any one of the designated formats depending upon how globally the developer chooses to define the exception in the IDL file. In the implemented embodiment, the second and third designated formats listed above are preferred.

Referring now to FIG. 3, a process of converting an exception identifier to a message string will now be described. Initially, in step 202 the client makes a request of the server process. As described above, the client could be an object or a program. The client may be requesting information of the server, or asking for an action or other activity. Step 204 illustrates the situation in which an exception has arisen in response to the client's request. Thus, the server returns a user exception identifier to the client. As described above, the exception identifier must be a string that uniquely identifies the exception that has occurred in the distributed object system. Although the exception identifier identifies the exception, more processing is required before the client can access the corresponding explanation message string.

Upon receiving an exception, the client will determine the exception type in step 207. The exception will either be a system exception or a user exception. In the described embodiment, each exception is a C++ object and part of an exception class hierarchy. Therefore, it can readily be determined whether the exception is a user exception or a system exception. After the exception type has been determined, the logic flows to step 208 where the exception identifier is processed to produce the exception tag and the message identifier. If the exception is a system exception, then the exception will be processed as a system exception as described in more detail below with reference to FIG. 4A. On the other hand, if the exception is a user exception, then the exception will be processed accordingly as described in more detail below with reference to FIG. 4B.

After the exception tag and the message identifier have been produced, the logic proceeds to step 210 which locates the binary host exception message file on the client computer by using the domain name. Because the binary host exception message file on the client computer has previously been named using the domain name as a prefix and using ".mox" as a suffix (for example), known techniques can be used to generate a valid file name identifier using the domain name and the suffix. By way of example, if the domain name is "eng.sun.com::modem", and the suffix is ".mox", a valid file name identifier "eng_sun_com_modem.mox" can be derived.

In step 212 the message identifier is passed to the binary host exception message file in order to retrieve the explanation message string. Since the message identifier and message string corresponding to a particular exception will have previously been stored as a pair in the host exception message file, conventional techniques for searching the binary tree representation of this file can be used in order to find the message string corresponding to the message identifier. The base language explanation message string (i.e. the English message string" in boxes 212 of the flow chart) is then returned to the client. After the base language explanation message string has been returned, a decision is made in step 213 as to whether the base language is the preferred language for the client. If so, the logic passes to step 218 where the exception message string is output for display or logging.

When it is determined in step 213 that the preferred language is not the base language, the logic proceeds to step 214 where the message string is passed to an international service function which will use similar binary tree searching techniques in order to search the foreign exception message file. As will be appreciated by those skilled in the art, such language translation mapping software is commercially available. One such implementation that is available for Sun Microsystem's Solaris operating system is a library function called gettext( ). The foreign exception message file can be located in a similar manner to that employed in step 210 to find the host exception message file. In one embodiment, the foreign exception message file will use the domain name as a suffix and ".mo" as a prefix. It should be noted that both the message identifier—message string pairs of the foreign exception message file can be explanation text strings. That is, in the foreign exception message file, the message identifier is the same as the message string of the host exception message file, and the message string of the foreign exception message file is the foreign language translation. Thus, by using the message string of the host exception message file, the international service function can search through the foreign exception message file until it finds a message identifier that is equivalent, and then return the corresponding message string, which will be the foreign language translation.

In step 216 the translated message string, the exception tag, or both are returned to the client. After the receiving the translated message string, the logic passes to step 218 where the client outputs the returned translated message string for display, logging or the like. That is, the string may be sent to a display for a user to see, it may be sent to a log file to be saved for future analysis, and/or it may be processed in some other fashion.

In an alternative embodiment of the present invention described briefly above, the message string is placed directly in the interface definition in the IDL code. In this embodiment, step 204 not only returns the exception identifier to the client, but also returns the message string, since the message string is known to the IDL compiler. The IDL compiler associates the exception with the message string such that when the exception arises, the server returns the exception identifier and the message string. In this alternative embodiment, the client would have direct access to the message string, and steps 206 through 212 would not be needed.

Figures 4A, 4B:
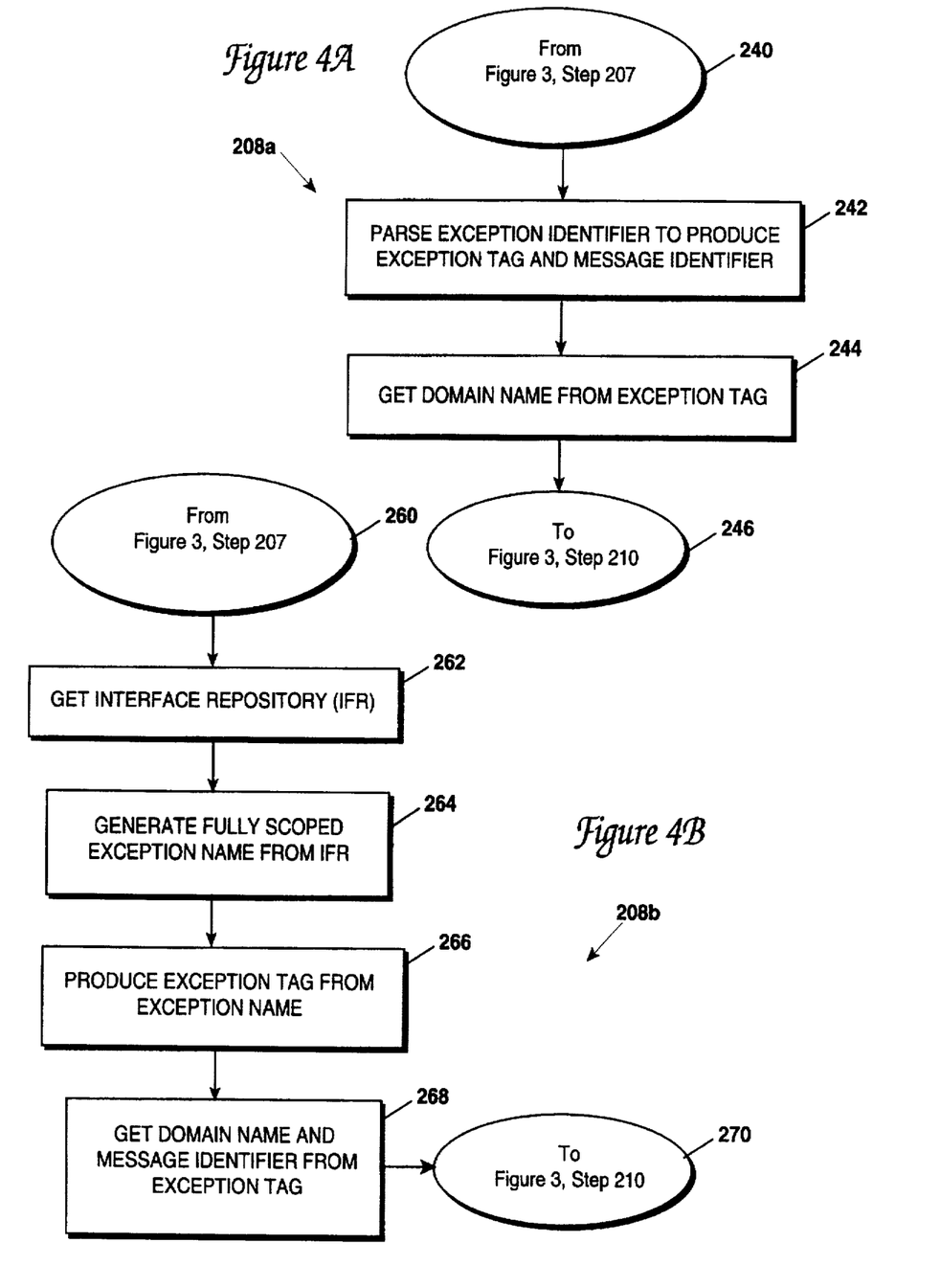
FIG. 4A shows a method for processing a system exception in order to produce an exception tag and a message identifier in accordance with one embodiment of the present invention.
FIG. 4B shows a method for processing a user exception in order to produce an exception tag and a message identifier in accordance with one embodiment of the present invention.

Referring next to FIG. 4B, a process 208b suitable for obtaining an exception tag and a message identifier (i.e. step 208 of FIG. 3) in the event that a user exception is received will be described in more detail. Initially, in step 262, the interface repository (IFR) is located. This step of locating the IFR can be accomplished in a variety of different ways as will be appreciated by those skilled in the art. Once the IFR is located, repeated calls to the IFR can be made in order to build up the fully-scoped exception name, as shown in step 264. It should be appreciated that the IFR knows about all of the interfaces on the system. Therefore, it can provide information that can be used to identify the source of the exception. A CORBA standard "within" call may be used to obtain such information. Using the example, described above in which the exception tag has the structure: site prefix, module, interface, exception name, a first call "look up exception ID" to the IFR would return a container, the name of which is the exception name. A second within call to the IFR container returned by the first call would return the interface within which the exception is contained. A third call to the IFR passes in the interface and receives the module containing that interface. A fourth call to the IFR passes the module and the IFR returns the site prefix. A fifth call to the IFR passes in the site prefix and then the IFR returns "interface repository", indicating that the process is complete. Thus, by starting with the exception identifier, and making repeated calls to the IFR, the following components are returned in the following order: exception name, interface, module, site prefix. Of course the order and nature of the names returned by the IFR will vary with the designated structure of the exception tag. Thus, the exception identifier allows the IFR to uniquely identify the exception within the distributed object system.

In step 266, using known programming techniques the components returned from the IFR can be reversed and concatenated together with double colons in order to produce the exception tag which would appear as follows:

site prefix::module::interface::exception name

After the exception tag has been identified, the logic moves to step 268 where the domain name and the message identifier are determined based upon the exception tag. The actual portion of the exception tag that is referred to as the domain name will vary greatly in accordance with nature of a particular system. In the described embodiment, the first two components of the exception tag (i.e. the site prefix and the module) are considered domain name while the message identifier constitutes the remainder of the exception tag (i.e. the interface and the exception name. There must be at least one component in the message identifier. For example, if the exception tag is: "sun.com::peripherals::modem:no_modem", then the domain name would be "sun.com::peripherals" and the message identifier would be "modem::no_modem". It should be appreciated that there may be other formats for the domain name and the message identifier, and that the components may have different permutations or be separated by other characters besides the double colon ": :" or by no characters at all. Once the exception tag, domain name and message identifier have been determined by the process 208b, then control returns to step 210 of FIG. 3 as described above.

Referring next to FIG. 4A, a method 208a suitable for obtaining an exception tag and a message identifier (i.e. step 208 of FIG. 3) in the event that a system exception is received will be described. Initially, in step 242, the exception identifier is parsed in order to produce the exception tag. In the described embodiment, a system exception may have a scope, an exception title, a subsystem name and a minor code. The scope indicates the motivation for the exception. The subsystem name identifies the subsystem that generated the exception and the minor code serves as a key for directly identifying the appropriate message string in the exception message file. By way of example, a possible exception tag is CORBA::bad_memory::ORB::6502. The scope indicates the motivation for the exception. In this case, it indicates that this is a CORBA mandated error message. In this case the exception title indicates a memory allocation problem. The subsystem name indicates that the error was generated by the ORB and the minor code provides a reference that can be used as a key to identify the appropriate message string in the message file. It should be appreciated that no site prefix or the like is required to handle system exceptions since only one entity, namely the system developer would typically be responsible for defining system errors and therefore all of the system error messages can be described in system error message files defined by the system developer.

Upon receiving a unique exception identifier representing a system exception, the exception identifier can be parsed by comparison to known message strings to produce the exception tag, which is the name given to the exception as it was defined in interface. After the exception tag has been identified, the logic moves to step 244 where the domain name and the message identifier are produced based upon the exception tag in a manner similar to that described above with reference to step 268 of FIG. 4B. Once the exception tag, domain name and message identifier have been determined by the process 208b, then control returns to step 210 of FIG. 3 as described above.

Figure 7:
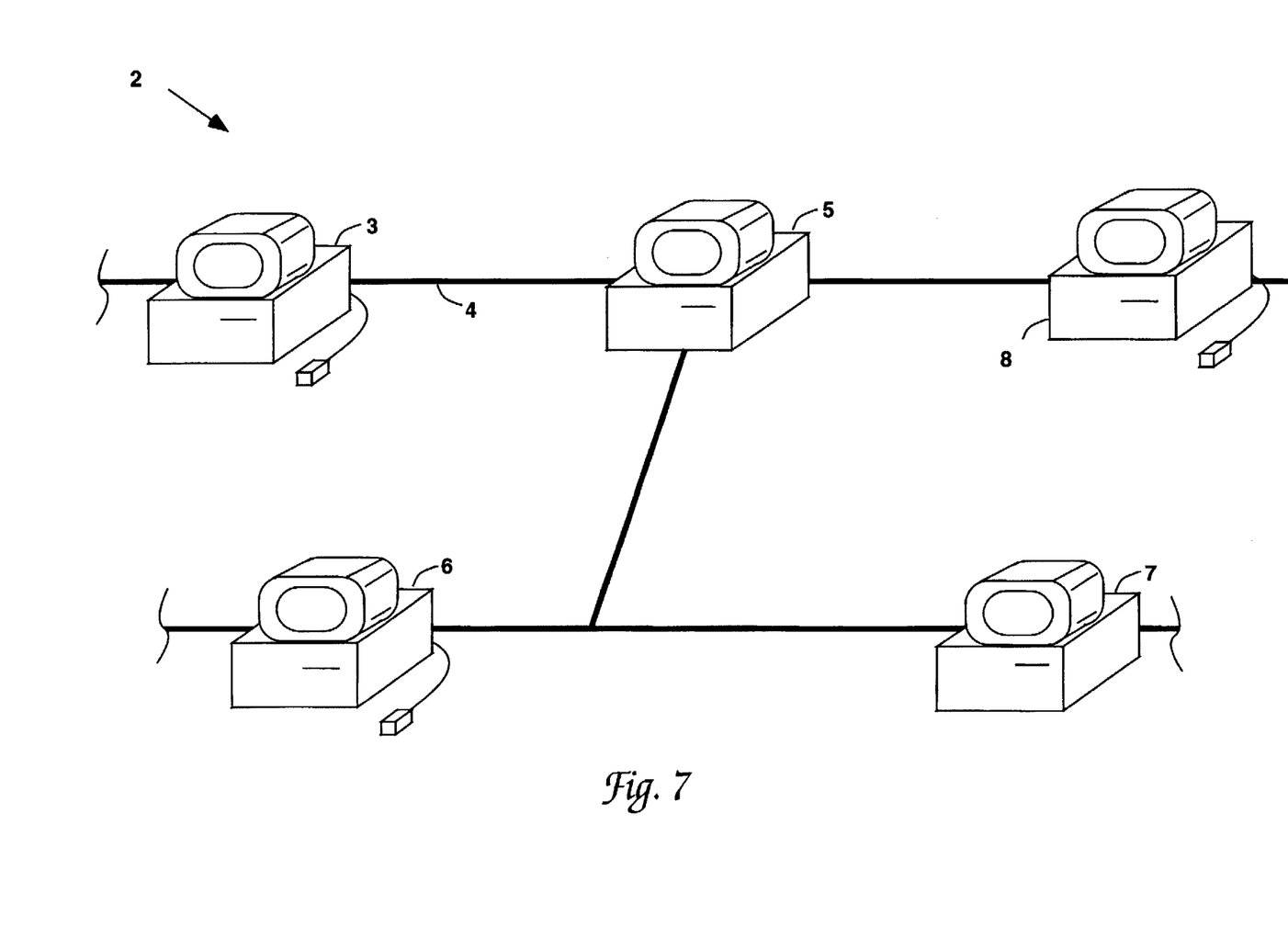
FIG. 7 is a pictorial illustration of various computers linked together in a computer network, any of which could be running both objects clients and servers.

In a preferred embodiment of the present invention, distributed objects are located on one or more computers linked together by a network. The network may take any suitable form. By way of example a representative network arrangement 2 is illustrated in FIG. 7. The network arrangement 2 includes a first computer 3 which is coupled to a transmission line 4. The network 2 further includes a server, router or the like 5 in addition to other computers 6, 7, and 8 such that data and instructions can be passed among the networked computers. The design, construction and implementation of computer networks will be familiar to those of skill in the art.

Figure 8:
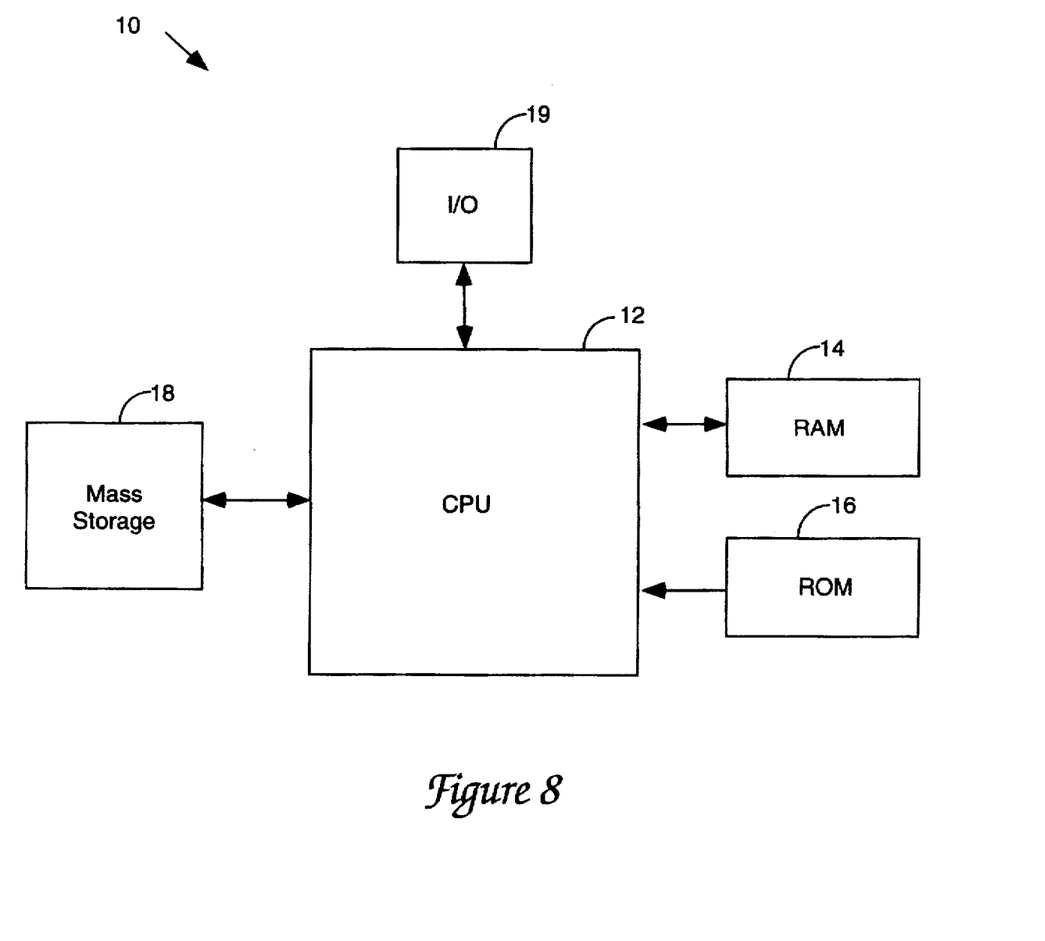
FIG. 8 illustrates diagrammatically some of the major components of one of the computers illustrated in FIG. 7.

A representative computer 10 suitable for use as computers 3, 6, 7, and 8 of FIG. 7 is illustrated schematically in FIG.

8. Computer 10 includes a central processing unit (CPU) 12 which is coupled bidirectionally with random access memory (RAM) 14 and unidirectionally with read only memory (ROM) 16. Typically, RAM 14 is used as a "scratch pad" memory and includes programming instructions and data (including distributed objects and their associated data and instructions) for processes currently operating on CPU 12. ROM 16 typically includes basic operating instructions, data and objects used by the computer to perform its functions. In addition, a mass storage device 18, such as a hard disk, CD ROM, magneto-optical (floptical) drive, tape drive or the like, is coupled bidirectionally with CPU 12. Mass storage device 18 generally includes additional programming instructions, data and objects that typically are not in active use by the CPU, although the address space may be accessed by the CPU, e.g., for virtual memory or the like. Each of the above described computers further includes an input/output source 19 that typically includes input media such as a keyboard, pointer devices (e.g., a mouse or stylus) and/or network connections. Additional mass storage devices (not shown) may also be connected to CPU 12 through a network connection. It will be appreciated by those skilled in the art that the above described hardware and software elements, as well as networking devices are of standard design and construction, and will be well familiar to those skilled in the art.

Although only a few embodiments of the present invention have been described in detail, it should be understood that the present invention may be embodied in many other specific forms without departing from the spirit or scope of the invention. The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given herein. Therefore, the present examples are to be considered as illustrative and not restrictive, and the invention is not to be limited to the details given herein, but may be modified within the scope of the appended claims.

We claim:

1. A computer-implemented method for interpreting exceptions received by a host computing system intended for use in a distributed object computing environment, the method comprising the computer controlled steps of:

receiving by said host computing system an exception identifier that uniquely identifies an exception raised by a remotely located device within said distributed object computing environment;

utilizing the exception identifier to help identify an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said identified exception tag to help identify an exception message file resident on the host computing system that corresponds to the remotely located device; and accessing the identified exception message file utilizing the message identifier of said identified exception tag to locate a message string that corresponds to the exception identifier, said message string containing a message for said host computing system that explains said exception raised by said remotely located device.

2. A computer-implemented method as recited in claim 1, further comprising the computer controlled step of determining whether the exception identifier represents a system exception or a user exception.

3. A computer-implemented method as recited in claim 2, wherein when it is determined that the exception identifier represents a system exception, the step of identifying the exception tag includes the substep of parsing under computer control the exception identifier to derive the exception tag.

4. A computer-implemented method as recited in claim 2, wherein when the exception identifier represents a user exception, the step of identifying the exception tag includes the computer controlled steps of:

locating an interface repository mechanism, the interface repository mechanism containing information relating the exception identifier to the exception tag; and accessing the interface repository mechanism using the exception identifier to determine the exception tag.

5. A computer-implemented method for interpreting exceptions received by a host computing system intended for use in a distributed object computing environment, the method comprising the computer controlled steps of:

receiving by said host computing system an exception identifier from a remotely located server device that uniquely identifies an exception raised by the remotely located server device within said distributed object computing environment;

accessing an interface repository mechanism utilizing the exception identifier to derive an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said derived exception tag to help identify an exception message file that corresponds to an interface of the remote server device; and accessing the identified exception message file utilizing the message identifier to locate the message string that corresponds to the exception identifier, said message string containing a message for said host computing system that explains said exception raised by said remotely located server device.

6. A computer-implemented method as recited in claim 5, wherein the interface repository accessing step includes the steps of accessing the interface repository mechanism using the exception identifier to obtain a first portion of the exception tag and repeating calls to the interface repository mechanism to obtain additional portions of the exception tag until all portions of the exception tag have been determined.

7. A computer-implemented method as recited in claim 6, wherein the exception message file resides in a memory of the host computer system.

8. A computer-implemented method as recited in claim 5, wherein the exception identifier is received in response to a server request made by a client resident on the host computing system, the interface repository mechanism accessing and exception message file accessing steps being performed by the client, the method further comprising the step of returning under computer control the message string from the exception message file to the client, wherein the message string includes a text string in a first language.

9. A computer-implemented method as recited in claim 8, further comprising the step of passing under computer control the message string to an international service function, the international service function returning a translated string to the client that provides the message of the message string in a second language.

10. A computer-implemented method as recited in claim 9, wherein the translated string resides in a exception translation file that corresponds to the host exception message file.

11. A computer system for use in a distributed object operating environment, the computer system comprising:

memory for storing data;

a connection mechanism for transmitting a request to a remotely located device and for receiving a response to the request, wherein the response to the request may take the form of a unique exception identifier indicative of an exception raised by or for the remotely located device within said distributed object operating environment;

an exception processing mechanism for processing the exception identifier to derive an exception tag that is distinct from the exception identifier, the exception tag including a domain name and a message identifier and that uniquely identifies said exception within said distributed object operating environment; and an exception message file resident in the memory that corresponds to the remotely located device, the exception message file including a plurality of message strings that correspond to exceptions that may be raised by or for the remotely located device wherein the domain name may be used to identify the exception message file and the message identifier may be used to identify a selected one of the message strings that is associated with the exception raised by or for the remotely located device, said message string containing a message for said host computing system that explains said exception raised by said remotely located device.

12. A computer system as recited in claim 11, further comprising a determination mechanism for determining whether the exception identifier represents a system exception or a user exception.

13. A computer system as recited in claim 12, further comprising a parsing mechanism for parsing the exception identifier to derive the exception tag.

14. A computer system as recited in claim 12, further comprising an interface repository, the interface repository containing information relating the interfaces that are supported by an object located on the computer system that is responsible for generating the request and receiving the response.

15. A computer system as recited in claim 1 wherein the message strings include textual explanations in a first language that are indicative of their associated exceptions, the computer system further comprising an international service device capable of identifying translated strings in a second language that correspond to the message strings.

16. A computer system as recited in claim 15, wherein the translated strings reside in an exception translation file that resides in the memory.

17. A distributed object computing system comprising a plurality of computers as described in claim 11 and a network interconnecting the computers.

18. A computer-implemented method as recited in claim 1 wherein said remotely located device is a remote computing system including a server and is located at a server site distinct from a host site where said host computing system is located, and wherein said exception identifier is received in response to a server request made by a client object resident on said host computing system, said method further comprising the steps of:

returning under computer control said message string from said exception message file to said client object, said message string including a text string in a first human language; and passing under computer control said returned message string to an international service function, said international service function returning a translated string to said client object that provides said message of said message string in a second human language.

19. A computer-implemented method as recited in claim 5 wherein said remotely located server device is a remote computing system including a server and is located at a server site distinct from a host site where said host computing system is located, and wherein said exception identifier is received in response to a server request made by a client object resident on said host computing system, said method further comprising the steps of:

returning under computer control said message string from said exception message file to said client object, said message string including a text string in a first human language; and passing under computer control said returned message string to an international service function, said international service function returning a translated string to said client object that provides said message of said message string in a second human language.

20. A computer system as recited in claim 11 wherein said remotely located device is a remote computing system including a server and is located at a server site distinct from a host site where said computer system is located, said computer system further comprising:

a client object resident on said computer system from which originates said request transmitted by said connection mechanism to said remote computing system, and to which said response is directed, wherein said message string from said exception message file is returned to said client object and includes a text string in a first human language; and an international service function to which is passed said returned message string from said client object and from which returns a translated string to said client object that provides said message of said message string in a second human language.

21. A computer-implemented method for interpreting exceptions received by a host computing system intended for use in a distributed object computing environment, the method comprising the computer controlled steps of:

transmitting a server request from a client object resident on said host computing system to a server located on a remote computing system, said remote computing system located at a site distinct from said host computing system;

receiving by said host computing system an exception identifier from said remote computing system, said exception identifier uniquely identifying an exception raised by said server within said distributed object computing environment;

accessing an interface repository mechanism utilizing the exception identifier to derive an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said derived exception tag to help identify an exception message file that corresponds to an interface of the server;

accessing the identified exception message file utilizing the message identifier to locate the message string that corresponds to the exception identifier, said message string containing a message for said host computing system that explains said exception raised by said server;

returning said message string from said exception message file to said client object, said message string including a text string in a first human language; and passing said returned message string to an international service function, said international service function returning a translated string to said client object that provides said message of said message string in a second human language.

22. A computer program product comprising a computer-usable medium having computer-readable program code embodied thereon for interpreting exceptions received by a host computing system intended for use in a distributed object computing environment, said computer program product comprising computer-readable program code for effecting the following steps within a computer system:

receiving by said host computing system an exception identifier that uniquely identifies an exception raised by a remotely located device within said distributed object computing environment;

utilizing the exception identifier to help identify an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said identified exception tag to help identify an exception message file resident on the host computing system that corresponds to the remotely located device; and accessing the identified exception message file utilizing the message identifier of said identified exception tag to locate a message string that corresponds to the exception identifier, said message string containing a message for said host computing system that explains said exception raised by said remotely located device.

23. A computer program product comprising a computer-usable medium having computer-readable program code embodied thereon for interpreting exceptions received by a host computing system intended for use in a distributed object computing environment, said computer program product comprising computer-readable program code for effecting the following steps within a computer system:

receiving by said host computing system an exception identifier from a remotely located server device that uniquely identifies an exception raised by the remotely located server device within said distributed object computing environment;

accessing an interface repository mechanism utilizing the exception identifier to derive an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said derived exception tag to help identify an exception message file that corresponds to an interface of the remote server device; and accessing the identified exception message file utilizing the message identifier to locate the message string that corresponds to the exception identifier, said message string containing a message for said host computing system that explains said exception raised by said remotely located server device.

24. A computer program product comprising a computer-usable medium having computer-readable program code embodied thereon for interpreting exceptions received by a host computing system intended for use in a distributed object computing environment, said computer program product comprising computer-readable program code for effecting the following steps within a computer system:

transmitting a server request from a client object resident on said host computing system to a server located on a remote computing system, said remote computing system located at a site distinct from said host computing system;

receiving by said host computing system an exception identifier from said remote computing system, said exception identifier uniquely identifying an exception raised by said server within said distributed object computing environment;

accessing an interface repository mechanism utilizing the exception identifier to derive an exception tag that uniquely identifies said exception within said distributed object computing environment and that can be used by the host computing system to locate a message string that corresponds to the exception identifier, the exception tag including a domain name and a message identifier and being distinct from said exception identifier;

utilizing the domain name of said derived exception tag to help identify an exception message file that corresponds to an interface of the server;

accessing the identified exception message file utilizing the message identifier to locate the message string that corresponds to the exception identifier, said message string containing a message for said host computing system that explains said exception raised by said server;

returning said message string from said exception message file to said client object, said message string including a text string in a first human language; and passing said returned message string to an international service function, said international service function returning a translated string to said client object that provides said message of said message string in a second human language.

* * * * *